(12) United States Patent
Kim

(10) Patent No.: US 11,172,437 B2
(45) Date of Patent: Nov. 9, 2021

(54) METHOD AND DEVICE FOR TRANSMITTING OR RECEIVING INFORMATION IN WIRELESS COMMUNICATION SYSTEM SUPPORTING NETWORK SLICING

(71) Applicant: LG ELECTRONICS INC., Seoul (KR)

(72) Inventor: Joonwoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/652,155

(22) PCT Filed: Oct. 2, 2018

(86) PCT No.: PCT/KR2018/011694
§ 371 (c)(1),
(2) Date: Mar. 30, 2020

(87) PCT Pub. No.: WO2019/070100
PCT Pub. Date: Apr. 11, 2019

(65) Prior Publication Data
US 2020/0252862 A1    Aug. 6, 2020

Related U.S. Application Data

(60) Provisional application No. 62/566,540, filed on Oct. 2, 2017.

(51) Int. Cl.
*H04W 4/00* (2018.01)
*H04W 48/18* (2009.01)
(Continued)

(52) U.S. Cl.
CPC ............. *H04W 48/18* (2013.01); *H04W 8/08* (2013.01); *H04W 48/16* (2013.01); *H04W 60/00* (2013.01)

(58) Field of Classification Search
CPC ........ H04W 48/18; H04W 8/08; H04W 48/16; H04W 60/00
(Continued)

(56) References Cited

U.S. PATENT DOCUMENTS 10,142,994 B2 * 11/2018 Lee ...................... H04W 72/048
10,284,495 B2 * 5/2019 Shimojou ............... H04L 47/82
(Continued)

OTHER PUBLICATIONS

Ericsson, "Network Slice Co-existence considerations," S2-175675, SA WG2 Meeting #122b, Sophia Antipolis, France, dated Aug. 21-25, 2017, 4 pages.
(Continued)

*Primary Examiner* — Marceau Milord
(74) *Attorney, Agent, or Firm* — Fish & Richardson P.C.

(57) ABSTRACT

The present specification proposes a method and a device for transmitting or receiving information in a wireless communication system supporting network slicing. Specifically, a method for transmitting a registration request message for a network by a terminal (user equipment (UE)) in a wireless communication system may comprise the steps of: receiving network slice selection assistance information (NSSAI) for the network, wherein the NSSAI includes at least one of first NSSAI set for the network, second NSSAI allowed to the network, and/or third NSSAI set for the terminal; generating a registration request message on the basis of the NSSAI; and transmitting the registration request message to the network, wherein the registration request message is generated on the basis of a third NSSAI value and/or whether the third NSSAI is included in the NSSAI.

11 Claims, 6 Drawing Sheets

(51) Int. Cl.
*H04W 8/08* (2009.01)
*H04W 48/16* (2009.01)
*H04W 60/00* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 10,313,997 | B2* | 6/2019 | Singh | H04W 60/00 |
| 10,595,268 | B2* | 3/2020 | Lee | H04W 76/28 |
| 10,608,928 | B2* | 3/2020 | Zhang | H04W 48/18 |
| 10,631,357 | B2* | 4/2020 | Park | H04W 80/02 |
| 10,694,365 | B2* | 6/2020 | Lee | H04W 48/16 |
| 10,856,265 | B2* | 12/2020 | Ryu | H04W 72/02 |
| 10,869,263 | B2* | 12/2020 | Velev | H04W 60/00 |
| 10,880,747 | B2* | 12/2020 | Hu | H04W 12/10 |
| 2012/0233302 | A1* | 9/2012 | Kallin | H04L 41/5025 709/221 |
| 2015/0142958 | A1* | 5/2015 | Tamura | H04L 67/1008 709/224 |
| 2017/0054595 | A1* | 2/2017 | Zhang | H04L 41/12 |
| 2017/0079059 | A1* | 3/2017 | Li | H04W 16/02 |
| 2017/0086118 | A1* | 3/2017 | Vrzic | H04W 36/26 |
| 2017/0141973 | A1* | 5/2017 | Vrzic | H04L 41/5051 |
| 2017/0208019 | A1* | 7/2017 | Shimojou | H04L 41/0896 |
| 2017/0367036 | A1* | 12/2017 | Chen | H04L 43/08 |
| 2018/0035399 | A1* | 2/2018 | Xu | H04W 8/06 |
| 2018/0041425 | A1* | 2/2018 | Zhang | H04W 64/00 |
| 2018/0192445 | A1* | 7/2018 | Jiang | H04W 72/0466 |
| 2018/0227871 | A1* | 8/2018 | Singh | H04W 12/068 |
| 2018/0324663 | A1* | 11/2018 | Park | H04W 36/08 |
| 2020/0120589 | A1* | 4/2020 | Velev | H04W 60/04 |
| 2020/0205065 | A1* | 6/2020 | Wei | H04W 48/18 |
| 2020/0228968 | A1* | 7/2020 | Bernardos | H04W 8/245 |

OTHER PUBLICATIONS

Motorola Mobility, Lenovo, "Application Function influence on slice selection," S2-175862, SA WG2 Meeting #122bis, Sophia Antipolis, France, dated Aug. 21-25, 2017, 7 pages.

Nokia, Alcatel-Lucent Shanghai Bell, Telecom Italia, "Network Slice access Subscription Management by a third party—message flow P-CR.," S2-175694, SA WG2 Meeting #122bis, Sophia Antipolis, France, dated Aug. 21-25, 2017, 14 pages.

Qualcomm Incorporated, "TS 23.501: Support for slice co-existence," S2-175757, SA WG2 Meeting #122bis, Sophia Antipolis, France, dated Aug. 21-25, 2017, 12 pages Telecom Italia, Huawei, "Slice Coexistence for R15," S2-176503, SA WGZ Meeting #122bis, Sophia Antipolis, France, dated Aug. 21-25, 2017, 10 pages.

* cited by examiner (a)　　　　　　　　　　　(b)

METHOD AND DEVICE FOR TRANSMITTING OR RECEIVING INFORMATION IN WIRELESS COMMUNICATION SYSTEM SUPPORTING NETWORK SLICING

CROSS-REFERENCE TO RELATED APPLICATIONS

This application is a National Stage filing under 35 U.S.C. 371 of International Application No. PCT/KR2018/011694, filed on Oct. 2, 2018, which claims the benefit of U.S. Provisional Applications No. 62/566,540, filed on Oct. 2, 2017, the contents of which are all hereby incorporated by reference herein in their entirety.

TECHNICAL FIELD

The disclosure relates to a method for transmitting/receiving information in a wireless communication system supporting network slicing, and more specifically, to a method for transmitting/receiving network slicing-related information and a device for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

Technical Problem

The disclosure aims to provide a method for protecting a UE's privacy when network slicing is used in a wireless communication system.

In particular, the disclosure proposes a method for configuring network slice assistance information (e.g., network slice selection assistance information (NSSAI)) based on a network slice service arrangement of a network.

Objects of the present disclosure are not limited to the foregoing, and other unmentioned objects would be apparent to one of ordinary skill in the art from the following description.

Technical Solution

According to an embodiment of the disclosure, a method of transmitting a registration request message for a network by a user equipment (UE) in a wireless communication system comprises receiving network slice selection assistance information (NSSAI) for the network, the NSSAI including at least one of first NSSAI configured for the network, second NSSAI allowed for the network, and/or third NSSAI configured for the UE, generating the registration request message based on the NSSAI, and transmitting the registration request message to the network, wherein the registration request message is generated based on whether the third NSSAI is included in the NSSAI and/or based on a value of the third NSSAI.

Further, according to an embodiment of the disclosure, in the method, if the third NSSAI is included in the NSSAI, the registration request message may be generated based on the value of the third NSSAI, and unless the third NSSAI is included in the NSSAI, the registration request message may include at least one of the first NSSAI and/or the second NSSAI.

Further, according to an embodiment of the disclosure, in the method, if the third NSSAI is included in the NSSAI, and the value of the third NSSAI is a preset, specific value, the registration request message may not include the first NSSAI, the second NSSAI, and the third NSSAI, and if the third NSSAI is included in the NSSAI, and the value of the third NSSAI is not the preset, specific value, the registration request message may be included in the third NSSAI.

Further, according to an embodiment of the disclosure, in the method, the preset, specific value may be a single (S)-NSSAI set to a NULL value or a value preset according to a predetermined rule.

Further, according to an embodiment of the disclosure, in the method, the third NSSAI may include at least one S-NSSAI, and the at least one S-NSSAI may be configured in a high-level first S-NSSAI group or a low-level second S-NSSAI group depending on priority of a service provided by the network.

Further, according to an embodiment of the disclosure, in the method, if the at least one S-NSSAI is configured in the first S-NSSAI group, an access and mobility management function (AMF) for the UE may be selected based on the at least one S-NSSAI.

Further, according to an embodiment of the disclosure, in the method, the third NSSAI may be configured UE-specifically.

According to an embodiment of the disclosure, a user equipment (UE) transmitting a registration request message to a network in a wireless communication system comprises a transceiver for transmitting/receiving a signal, and a processor controlling the transceiver, wherein the processor controls to receive network slice selection assistance information (NSSAI) for the network, the NSSAI including at least one of first NSSAI configured for the network, second NSSAI allowed for the network, and/or third NSSAI configured for the UE, generate the registration request message based on the NSSAI, and transmit the registration request message to the network, wherein the registration request message is generated based on whether the third NSSAI is included in the NSSAI and/or based on a value of the third NSSAI.

Further, according to an embodiment of the disclosure, in the UE, if the third NSSAI is included in the NSSAI, the registration request message may be generated based on the value of the third NSSAI, and unless the third NSSAI is included in the NSSAI, the registration request message may include at least one of the first NSSAI and/or the second NSSAI.

Further, according to an embodiment of the disclosure, in the UE, if the third NSSAI is included in the NSSAI, and the value of the third NSSAI is a preset, specific value, the registration request message may not include the first NSSAI, the second NSSAI, and the third NSSAI, and if the third NSSAI is included in the NSSAI, and the value of the third NSSAI is not the preset, specific value, the registration request message may be included in the third NSSAI.

Further, according to an embodiment of the disclosure, in the UE, the preset, specific value may be a single (S)-NSSAI set to a NULL value or a value preset according to a predetermined rule.

Further, according to an embodiment of the disclosure, in the UE, the third NSSAI may include at least one S-NSSAI, and the at least one S-NSSAI may be configured in a high-level first S-NSSAI group or a low-level second S-NSSAI group depending on priority of a service provided by the network.

Further, according to an embodiment of the disclosure, in the UE, if the at least one S-NSSAI is configured in the first S-NSSAI group, an access and mobility management function (AMF) for the UE may be selected based on the at least one S-NSSAI.

Further, according to an embodiment of the disclosure, in the UE, the third NSSAI may be configured UE-specifically.

According to an embodiment of the disclosure, a network routing a registration request message for the network in a wireless communication system comprises a transceiver for transmitting/receiving a signal, and a processor controlling the transceiver, wherein the processor controls to receive the registration request message from a UE, and route the registration request message to a specific access and mobility management function (AMF), wherein the UE receives network slice selection assistance information (NSSAI) for the network, the NSSAI including at least one of first NSSAI configured for the network, second NSSAI allowed for the network, and/or third NSSAI configured for the UE, and wherein the registration request message is generated based on whether the third NSSAI is included in the NSSAI and/or based on a value of the third NSSAI.

Advantageous Effects

According to an embodiment of the disclosure, it may be possible to reduce a threat to UE privacy that may occur due to transfer of NSSAI despite lack of security context in signaling (e.g., SNA signaling) between UE and network.

Further, according to an embodiment of the disclosure, it may be possible to efficiently route a registration request message to a network function capable of supporting a network slice providing a service required for a UE when network slicing is used in a wireless communication system.

Effects of the present disclosure are not limited to the foregoing, and other unmentioned effects would be apparent to one of ordinary skill in the art from the following description.

BRIEF DESCRIPTION OF DRAWINGS

The accompanying drawings, which are included herein as a part of the description for help understanding the present disclosure, provide embodiments of the present disclosure, and describe the technical features of the present disclosure with the description below.

DETAILED DESCRIPTION

Figure 1:
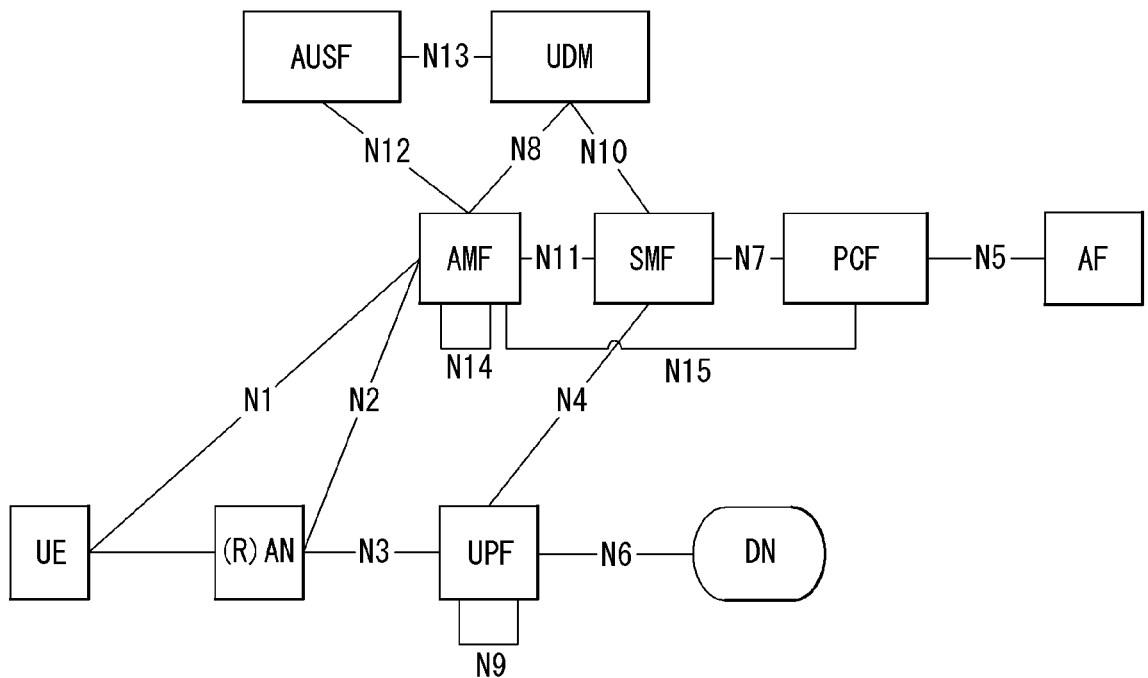
FIG. 1 illustrates a wireless communication system architecture to which the present disclosure is applicable.

In what follows, preferred embodiments according to the present disclosure will be described in detail with reference to appended drawings. The detailed descriptions provided below together with appended drawings are intended only to explain illustrative embodiments of the present disclosure, which should not be regarded as the sole embodiments of the present disclosure. The detailed descriptions below include specific information to provide complete understanding of the present disclosure. However, those skilled in the art will be able to comprehend that the present disclosure can be embodied without the specific information.

For some cases, to avoid obscuring the technical principles of the present disclosure, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present disclosure, and the specific terms can be used in different ways as long as it does not leave the technical scope of the present disclosure.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present disclosure can be supported by standard documents disclosed in at least one of wireless access systems including the IEEE 802, 3GPP, and 3GPP2 specifications. In other words, among the embodiments of the present disclosure, those steps or parts omitted for the purpose of clearly describing technical principles of the present disclosure can be supported by the documents above. Also, all of the terms disclosed in this document can be explained with reference to the standard documents.

To clarify the descriptions, this document is based on the 3GPP LTE/LTE-A, but the technical features of the present disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

In what follows, the present disclosure will be described based on the terms defined above.

5G system architecture to which the present disclosure is applicable

A 5G system is an advanced technology from 4G LTE mobile communication technology and supports a new Radio Access Technology (RAT), extended Long Term Evolution (eLTE) as an extended technology of LTE, non-3GPP access (e.g., Wireless Local Area Network (WLAN) access), etc. through the evolution of an existing mobile communication network structure or a Clean-state structure.

5G system architecture is defined to support data connection and service such that deployment can use technologies such as network function virtualization and software defined networking. The 5G system architecture utilizes service-based interaction between control plane (CP) and network function (NF).

FIG. 1 illustrates a wireless communication system architecture to which the present disclosure is applicable.

The 5G system architecture may include various components (i.e., network functions (NFs)), and FIG. 1 shows some of the components.

Access and Mobility Management Function (AMF) supports functions such as signaling between CN nodes for mobility between 3GPP access networks, termination of a radio access network (RAN) CP interface (N2), termination of NAS signaling (N1), registration management (registration area management), idle mode UE reachability, network slicing support, SMF selection, and the like.

Some or all functions of the AMF may be supported in a single instance of one AMF.

Data network (DN) refers to an operator service, Internet access or third party service and the like, for example. The DN transmits a downlink protocol data unit (PDU) to the UPF or receives, from the UPF, a PDU transmitted from the UE.

Policy Control function (PCF) receives information about packet flow from an application server and provides a function of determining policies such as mobility management and session management.

Session Management Function (SMF) provides a session management function and may be managed by different SMFs per session when the UE has a plurality of sessions.

Some or all functions of the SMF may be supported in a single instance of one SMF.

Unified Data Management (UDM) stores user subscription data, policy data and the like.

User plane Function (UPF) forwards a downlink PDU received from the DN to the UE via a (R)AN and forwards an uplink PDU received from the UE to the DN via the (R)AN.

Application Function (AF) interacts with a 3GPP core network for service provision (e.g., supporting functions such as application influence on traffic routing, network capability exposure access, and interaction with policy framework for policy control).

(Radio) Access Network ((R)AN) is a generic term for new radio access networks supporting both of evolved E-UTRA (E-UTRA) which is an evolved version of 4G radio access technology and New Radio (NR) access technology (e.g., gNB).

The gNB supports functions such as functions for radio resource management (i.e., radio bearer control, radio admission control, connection mobility control, dynamic allocation of resources to UE on uplink/downlink (i.e., scheduling), and the like.

The User Equipment (UE) refers to a user device.

In the 3GPP system, a conceptual link connecting NFs in a 5G system is defined as a reference point.

N1 (or NG1) means a reference point between the UE and the AMF, N2 (or NG2) means a reference point between the (R)AN and the AMF, N3 (or NG3 means a reference point between the (R)AN and the UPF, N4 (NG4) means a reference point between the SMF and the UPF, N5 (NG5) means a reference point between the PCF and the AF, N6 (or NG6) means a reference point between the UPF and a data network, N7 (NG7) means a reference point between the SMF and the PCF, N24 (NG24) means a reference point between the PCF in a visited network and the PCF in a home network, N8 (NG8) means a reference point between the UDM and the AMF, N9 (NG9) means a reference point between two core UPFs, N10 (NG10) means a reference point between the UDM and the SMF, N11 (NG11) means a reference point between the AMF and the SMF, N12 (NG12) means a reference point between the AMF and the AUSF, N13 (NG13) means a reference point between the UDM and the authentication server function (AUSF), N14 (NG14) means a reference point between two AMFs, and N15 (NG15) means a reference point between the PCF and the AMF in the case of a non-roaming scenario and reference point between the PCF and the AMF in a visited network in the case of a roaming scenario.

Meanwhile, although FIG. 1 illustrates a reference model for cases in which a UE accesses a single DN using a single PDU session for the convenience of description, the present disclosure is not limited thereto.

Figure 2:
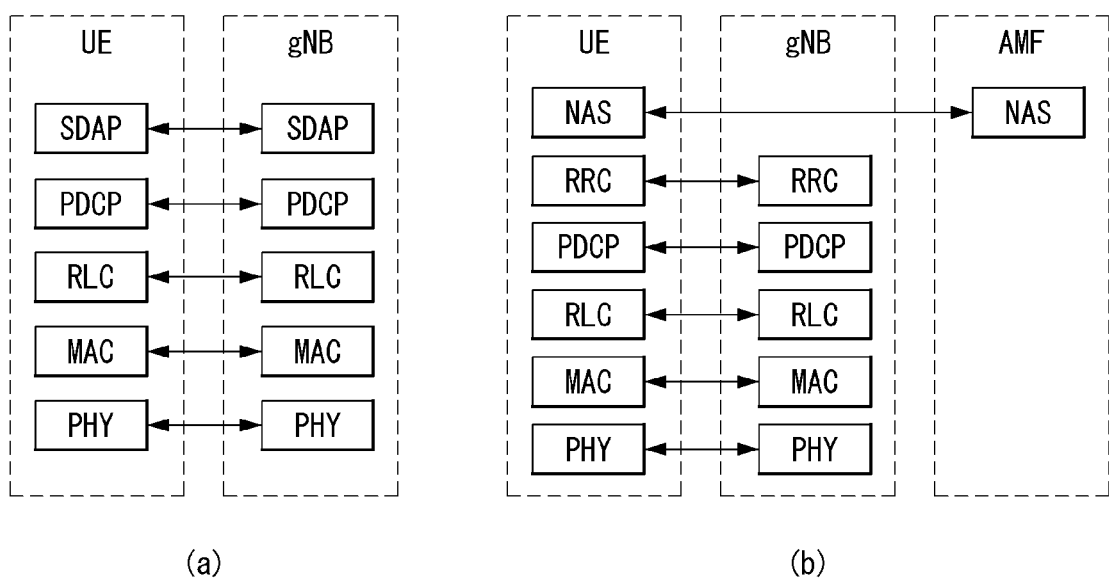
FIG. 2 is a diagram illustrating a wireless protocol stack in a wireless communication system to which the present disclosure is applicable.

FIG. 2 is a diagram illustrating a wireless protocol stack in a wireless communication system to which the present disclosure is applicable.

FIG. 2(a) illustrates a radio interface user plane protocol stack between a UE and gNB, and FIG. 2(b) illustrates a radio interface control plane protocol stack between the UE and the gNB.

The control plane means a path through which control messages used for a UE and a network to manage calls are transmitted. The user plane means a path through which data generated in an application layer, for example, voice data, Internet packet data, and so on are transmitted.

Referring to FIG. 2(a), the user plane protocol stack may be divided into Layer 1 (i.e., physical (PHY) layer) and Layer 2.

Referring to FIG. 2(b), the control plane protocol stack may be divided into Layer 1 (i.e., PHY layer), Layer 2, Layer 3 (i.e., radio resource control (RRC) layer), and a Non-Access Stratum (NAS) layer.

The Layer 2 is divided into a Medium Access Control (MAC) sublayer, a Radio Link Control (RLC) sublayer, a Packet Data Convergence Protocol (PDC) sublayer, and a Service Data Adaptation Protocol (SDAP) sublayer (in case of the user plane).

A radio bearer is classified into two groups: data radio bearer (DRB) for user plane data and signaling radio bearer (SRB) for control plane data.

Each layer of the control plane and the user plane of the radio protocol is described below.

1) The Layer 1, i.e., the PHY layer, provides information transfer service to an upper layer by using a physical channel. The PHY layer is connected to the MAC sublayer located at an upper level through a transport channel, and data are transmitted between the MAC sublayer and the PHY layer through the transport channel. The transport channel is classified according to how and which feature data is transmitted via a radio interface. And, data is transmitted between different PHY layers, between a PHY layer of a transmitter and a PHY layer of a receiver, through a physical channel.

2) The MAC sublayer performs mapping between a logical channel and a transport channel; multiplexing/de-multiplexing of MAC Service Data Unit (SDU) belonging to one or different logical channel(s) to/from a transport block (TB) delivered to/from the PHY layer through a transport channel; scheduling information reporting; error correction through hybrid automatic repeat request (HARQ); priority handling between UEs using dynamic scheduling; priority handling between logical channels of one UE using logical channel priority; and padding.

Different kinds of data deliver a service provided by the MAC sublayer. Each logical channel type defines what type of information is delivered.

The logical channel is classified into two groups: a Control Channel and a Traffic Channel.

i) The Control Channel is used to deliver only control plane information and is as follows.

Broadcast Control Channel (BCCH): a downlink channel for broadcasting system control information.

Paging Control Channel (PCCH): a downlink channel that delivers paging information and system information change notification.

Common Control Channel (CCCH): a channel for transmitting control information between a UE and a network. This channel is used for UEs having no RRC connection with the network.

Dedicated Control Channel (DCCH): a point-to-point bi-directional channel for transmitting dedicated control information between the UE and the network. This channel is used by the UE having an RRC connection.

ii) The Traffic Channel is used to use only user plane information.

Dedicated Traffic Channel (DTCH): a point-to-point channel, dedicated to a single UE, for delivering user information. The DTCH may exist in both uplink and downlink.

In the downlink, connection between the logical channel and the transport channel is as follows.

The BCCH may be mapped to BCH. The BCCH may be mapped to DL-SCH. The PCCH may be mapped to PCH. The CCCH may be mapped to the DL-SCH. The DCCH may be mapped to the DL-SCH. The DTCH may be mapped to the DL-SCH.

In the uplink, connection between the logical channel and the transport channel is as follows. The CCCH may be mapped to UL-SCH. The DCCH may be mapped to the UL-SCH. The DTCH may be mapped to the UL-SCH.

3) The RLC sublayer supports three transmission modes: a Transparent Mode (TM), an Unacknowledged Mode (UM), and an Acknowledged Mode (AM).

The RLC configuration may be applied for each logical channel. In case of SRB, the TM or the AM is used. On the other hand, in case of DRB, the UM the AM is used.

The RLC sublayer performs the delivery of the upper layer PDU; sequence numbering independent of PDCP; error correction through automatic repeat request (ARQ); segmentation and re-segmentation; reassembly of SDU; RLC SDU discard; and RLC re-establishment.

4) A PDCP sublayer for the user plane performs Sequence Numbering; header compression and decompression (Robust Header Compression (RoHC) only); delivery of user data; reordering and duplicate detection (if the delivery to a layer above the PDCP is required); PDCP PDU routing (in case of a split bearer); re-transmission of PDCP SDU; ciphering and deciphering; PDCP SDU discard; PDCP re-establishment and data recovery for RLC AM; and duplication of PDCP PDU.

The PDCP sublayer for the control plane additionally performs Sequence Numbering; ciphering, deciphering and integrity protection; delivery of control plane data; duplicate detection; and duplication of PDCP PDU.

When duplication is configured for a radio bearer by RRC, an additional RLC entity and an additional logical channel are added to the radio bearer to control the duplicated PDCP PDU(s). The duplication at PDCP includes transmitting the same PDCP PDUs twice. Once it is transmitted to the original RLC entity, and a second time it is transmitted to the additional RLC entity. In this instance, the original PDCP PDU and the corresponding duplicate are not transmitted to the same transport block. Two different logical channels may belong to the same MAC entity (in case of CA) or different MAC entities (in case of DC). In the former case, logical channel mapping restriction is used to ensure that the original PDCP PDU and the corresponding duplicate are not transmitted to the same transport block.

5) The SDAP sublayer performs i) mapping between QoS flow and data radio bearer, and ii) QoS flow identification (ID) marking in downlink and uplink packet.

A single protocol entity of SDAP is configured for each individual PDU session, but exceptionally, in case of dual Connectivity (DC), two SDAP entities can be configured.

6) A RRC sublayer performs broadcast of system information related to Access Stratum (AS) and Non-Access Stratum (NAS); paging initiated by 5GC or NG-RAN; establishment, maintenance and release of RRC connection between UE and NG-RAN (additionally including modification and release of carrier aggregation and also additionally including modification and release of Dual Connectivity between E-UTRAN and NR or in NR); security function including key management; establishment, configuration, maintenance and release of SRB(s) and DRB(s); delivery of handover and context; UE cell selection and re-release and control of cell selection/reselection: mobility function including inter-RAT mobility; QoS management function, UE measurement reporting and control of reporting; detection of radio link failure and recovery from radio link failure; and NAS message delivery from NAS to UE and NAS message delivery from UE to NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

Core network control plane and user plane function
NG-RAN
Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.
Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

The UE may store (S-)NSSAIs (i.e., configured NSSAI) and/or allowed NSSAI) by the following method.

Where the UE is provided with the configured NSSAI for the PLNM in the UE, the existing configured NSSAI may be required to be stored in the UE until a new configured NSSAI for the PLMN is provided to the UE by the HPLM. When a new configured NSSAI for the PLMN is provided, the UE may be required to replace the configured NSSAI stored for the PLMN with the new configured NSSAI and delete all of the allowed NSSAI and rejected S-NSSAI stored for the PLMN.

In the case of reception, the allowed NSSAI for the PLMN may be stored in the UE until a new configured NSSAI for the PLMN is received, including the case where the UE is turned off. Where a new allowed NSSAI for the PLMN is received, the UE may be required to replace the allowed NSSAI stored for the PLMN with the new allowed NSSAI.

In the case of reception, a temporarily rejected S-NSSAI for the PLMN while RM-REGISTERED may be stored in the UE.

In the case of reception, a permanently rejected S-NSSAI for the PLMN while RM-REGISTERED may be stored in the UE.

2) Slice Changing

The network may vary the already selected network slice instance depending on, e.g., local policy, UE's mobility, or subscription information. That is, the UE's set of network slices may be varied any time while the UE remains registered in the network. Further, variation of the UE's set of network slices may be initiated by the UE under a specific condition or by the network.

The network may vary the set of allowed network slice(s) were the UE has been registered based on local policy, variation in subscription information, and/or UE's mobility. The network may perform such variation during a registration procedure or may notify the UE of the variation in network slice(s) supported using a procedure that may trigger a registration procedure.

Upon network slice variation, the network may provide new allowed NSSAI and tracking area list to the UE. The UE may include new NSSAI in signaling according to the mobility management procedure and transmit the same, thereby triggering reselection of a slice instance. As the slice instance is varied, the AMF supporting the same may be changed as well.

If the UE enters the area where the network slice is not available any longer, the core network releases the PDU session for S-NSSAI corresponding to the unavailable network slice via a PDU session release procedure.

When the PDU session corresponding to the slice which is not available any longer is released, the UE determines whether existing traffic may be routed via the PDU session belonging to other slice using the UE policy.

To vary the set of S-NSSAI(s) used, the UE initiates a registration procedure.

3) SMF Selection

The PCF provides a network slice selection policy (NSSP) to the UE. The NSSP is used by the UE to associate the UE with S-NSSAI and to determine the PDU session for routing traffic.

The network slice selection policy is provided per application of the UE, and this includes a rule that may map S-NSSAI per application. The AMF selects an SMF for PDU session management using, e.g., subscriber information and local carrier policy along with SM-NSSAI and DNN information transferred by the UE.

For the RAN to be able to access a specific function of slice instance upon establishing the PDU session for a specific slice instance, the CN provides the (R)AN with the S-NSSAI corresponding to the slice instance where this PDU session belongs.

The requirements for NGMN (Next Generation Mobile Networks) Alliance have been defined with regard to a network slicing concept.

Figure 3:
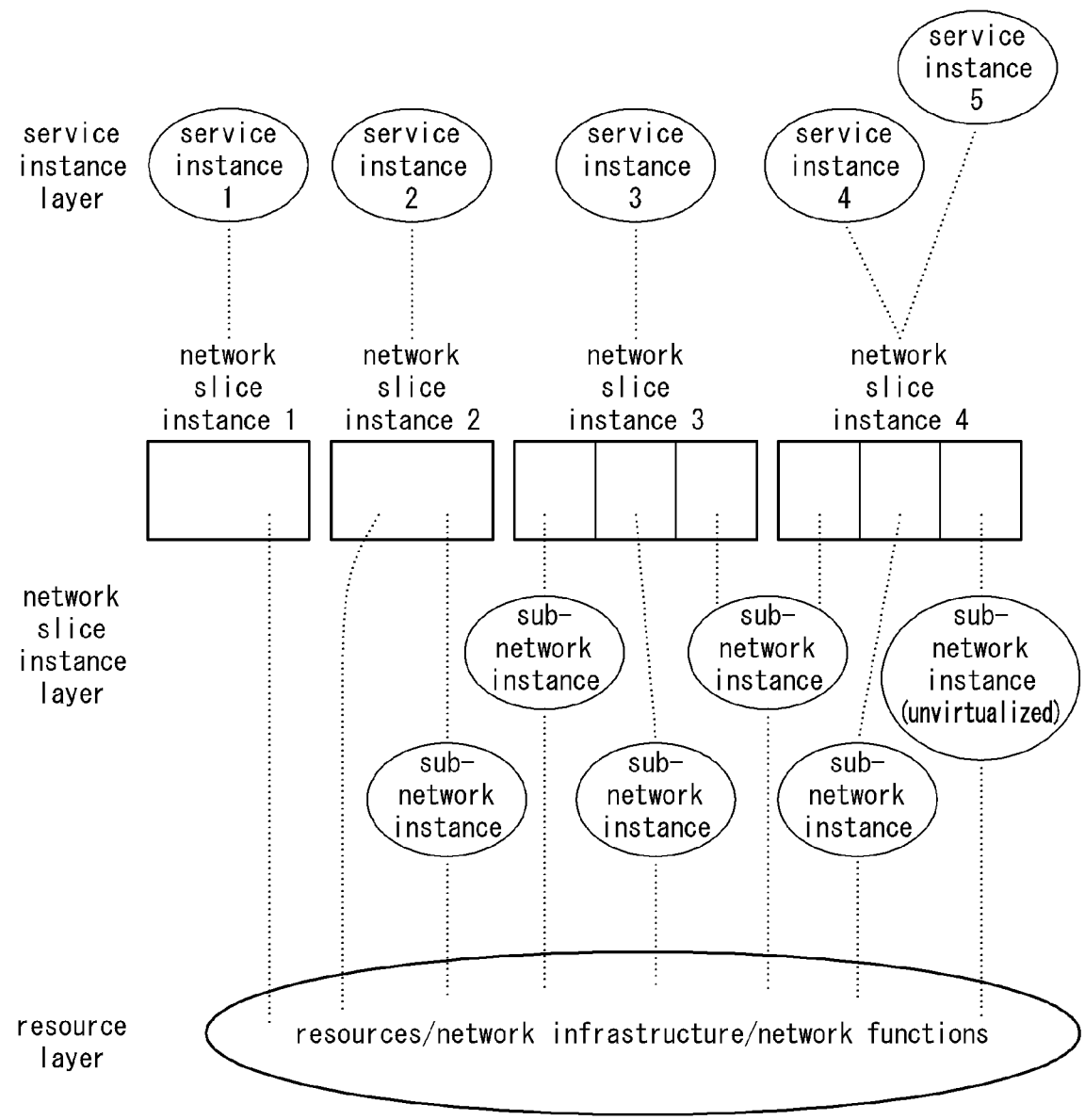
FIG. 3 is a view illustrating the concept of network slicing to which the disclosure may apply.

FIG. 3 illustrates a network slicing concept according to an embodiment of the present disclosure.

Referring to FIG. 3, a network slicing may include 3 layers of 1) service instance layer, 2) network slice instance layer, and 3) resource layer.

The service instance layer represents services (end-user service or business service) which are to be supported. Each service may be denoted by a service instance. Typically, the services may be provided by the network operator or the 3rd parties. Hence, the service instance can represent either an operator service or a 3rd party provided service.

A network operator may use a network slice blueprint to create a network slice instance. The network slice instance provides network characteristics which are required by a service instance. The network slice instance may also be shared across multiple service instances provided by the network operator.

The network slice instance may or may not consist of one or more sub-network instances which cannot be shared by another network slice instance. Similarly, a sub-network blueprint may be used to create a sub-network instance to form a set of network functions which run on the physical/logical resources.

The terminologies related to the network slicing are defined below.

Service Instance: An instance of an end-user service or a business service that is realized within or by a network slice.

Network Slice Instance: a set of network functions and resources to run these network functions, forming a complete instantiated logical network to meet certain network characteristics required by the service instance, A network slice instance may be fully or partly, logically and/or physically, isolated from another network slice instance, The resources include physical and logical resources, A network slice instance may be composed of sub-network instances which as a special case may be shared by multiple network slice instances. The network slice instance is defined by a network slice blueprint, Instance-specific policies and configurations are required when creating a network slice instance, Examples of network characteristics include ultra-low-latency, ultra-reliability etc.

Network Slice Blueprint: A complete description of structure, configuration and plans/work flows for how to instantiate and control the network slice instance during its life cycle. A network slice blueprint enables the instantiation of a network slice which provides certain network characteristics (e.g., ultra-low latency, ultra-reliability, value-added services for enterprises, etc.). A network slice blueprint refers to required physical and logical resources and/or to sub-network blueprint(s).

Sub-network Instance: A sub-network instance includes a set of network functions and the resources for these network functions, The sub-network instance is defined by a sub-network blueprint, A sub-network instance is not required to form a complete logical network, A sub-network instance may be shared by two or more network slices, The resources include physical and logical resources.

Sub-network Blueprint: A description of the structure (and contained components) of the sub-network instances and the plans/work flows for how to instantiate it, and a sub-network blueprint refers to physical and logical resources and may refer to other sub-network blueprints.

Physical Resource: A physical asset for computation, storage or transport including radio access: Network Functions are not regarded as Resources.

Logical Resource: Partition of a physical resource, or grouping of multiple physical resources dedicated to a network function or shared between a set of network functions.

Network Function (NF): Network Function refers to processing functions in a network, The NF includes but is not limited to telecom node functionality as well as switching functions (e.g., Ethernet switching function, IP routing function), VNF is a virtualized version of a NF (refer to ETSI NFV for further details on VNF).

Based on this, in SA WG1, the following potential requirements are defined through the SMARTER work.

Unlike previous 3GPP systems that attempted to provide a 'one size fits all' system, the 5G system should be able to simultaneously provide optimized support for various configurations through various means. Flexibility and adaptability on network functionality and service are a key distinguishing feature of the 5G system.

Flexibility Enabler 1: Network Slicing

One key concept to achieve a goal of flexibility is network slicing. The network slicing can allow an operator to provide dedicated logical networks with customer specific functionality while maintaining the economies of scale of a common infrastructure. It allows services to be abstracted from the network resources. As such, a variety of use cases with diverging requirements can be fulfilled. For example, there may be different requirements on functionality such as charging, policy control, security, mobility etc. The use cases may also have differences in performance requirements. For example, the latency can be reduced, and the mobility and a data rate can increase.

There is also a need to isolate the different slices from each other. The UEs can be connected to appropriate network slices at the same time in ways that fulfill the operator or the user needs, e.g., based on subscription, traffic (e.g., voice, data), or UE type.

Typically, a set of end-user services are provided by one network slice of a mobile network operator. Some UEs can simultaneously access two or more network slices for services of more diverse characteristics, e.g., MBB and critical communication. When simultaneously accessing two or more network slices, the operator can select the network slices to not duplicate a certain signaling procedure.

The network slices may consist of mainly 3GPP defined functions but may also include proprietary functions that are provided by other operators or 3rd parties. To guarantee a consistent user experience and the service support in case of roaming, slices consisting of the same network function should be available for the VPLMN user. Configuration of the network slices and provisioning of proprietary functions are based on agreements between the operators.

The network slicing may also be used to provide a network configuration enabling basic communications (e.g., voice, text message) in case of natural disasters. Another example of applying this concept may be to provide access to the network in markets where there is a need for providing access to required services with a basic Internet access (e.g., basic broadband speed, relaxed latency requirements).

The operator often provides similar service to multiple 3rd parties (e.g., enterprises) that require similar network functionalities, which should be supported in an efficient manner.

The 5G system (i.e., 3GPP system) shall allow the operator to create and manage network slices. A network slice consists of a set of network functions (e.g., potentially different vendors), and policies, configurations, and resources to run these network functions.

The 5G system shall allow the operator to dynamically create a network slice in order to form a complete, autonomous and fully operational network that is customized for different market scenarios.

The 5G system shall be able to associate specific services, devices, UEs, and subscribers with a particular network slice.

The 5G system shall enable the UE to simultaneously access the services from one or more network slices of one operator based on, for example, subscription or UE type.

The 5G system shall support mechanisms that enable the operator to operate and manage network slices that fulfill required criteria for different market scenarios.

The 5G system shall allow the operator to simultaneously operate network slices in a manner that prevents a service in one slice from negatively affecting services offered by other slices.

The 5G system shall have the capability to conform to security assurance requirements per service in a single network slice, rather than the whole network.

The 5G system shall be able to provide a level of isolation between network slices which confines a potential cyberattack to a single network slice.

The 5G system shall allow the operator to authorize 3rd parties to create and manage a network slice via suitable APIs, within the limits set by the network operator.

The 5G system shall support the elasticity of a network slice in terms of capacity to minimize an influence on the services of this slice or other slices.

The 5G system shall be able to support modifications to the network slices (e.g., adding, deleting, modifying the network slices) while minimizing an influence on active subscriber services.

The 5G system shall be able to support end-to-end (E2E) (e.g., RAN, CN) resource management in a network slice.

The 5G system shall enable the operators to use the network slicing concept to efficiently support multiple 3rd parties (e.g., enterprises) that require similar network characteristics.

The 5G system shall enable the operators to define and identify network slices with common functionality to be available for home and roaming users.

The 5G system shall enable operators to specify the network functionalities that a network slice has to provide.

The 5G system shall support the inclusion of 5G defined functions as well as proprietary 3rd party or operator provided functions in a network slice.

Hosting multiple 3rd parties (e.g., enterprises) or mobile virtual network operators (MVNOs).

Serving home and roaming user.

Supporting diverse market scenarios.

The specific functional areas, for which the system should support proprietary or operator provided functions, should be identified.

The 5G system shall support a mechanism for the VPLMN to assign the UE to a network slice with the required functionality or to a default network slice.

The 5G system shall be able to change the network slice to which the UE is connected.

A network slice shall support a set of end-user services as defined by the network operator.

The 5G system shall enable the operator to assign the UE to a network slice based on services provided by the network slice.

The 5G system shall support a mechanism for an operator to authorize the UE to receive service on a specific slice in response to a request from a 3rd party.

Further, the following privacy considerations may be taken into account in relation to the above-described network slicing.

Specifically, when the UE is aware or configured of privacy considerations applied to NSSAI so as to support network-controlled privacy of slice information for the slice accessed by the UE:

The UE may be required not to include NSSAI in NAS signaling unless there is a NAS security context.

The UE may be required not to include NSSAI in unprotected RRC signaling.

As in the above-described privacy considerations of network slicing, the UE's privacy may be invaded by the method of defining the S-NSSAI value included in the NSSAI. Thus, a proper consideration and protection scheme may be needed.

Where a NAS security context is created between UE and core network (CN), NAS signaling may be encrypted and protected by the NAS security context. In contrast, since the registration request message (i.e., a request message used in the registration step of UE) itself lacks NAS security context, others (e.g., invaders) may look into the S-NSSAI value included in the registration request message by tapping (e.g., wired/wireless tapping). Similarly, if NSSAI is included in AS signaling with no AS security context present (i.e., NSSAI is transferred via AS signaling without SA security context), the tapping issue may arise. At this time, use of NSSAI in unsecured (that is, free from security context) message signaling may be intended for efficiency of AMF allocation and routing.

For example, if the S-NSSAI value indicates a network slice for a dedicated service used by an investigator on a stakeout, the S-NSSAI value may be used to figure out whether the investigator is in the corresponding region. As another example, if only a few personnel are served by the network slice to be determined through the S-NSSAI, it may be identified or determined through the S-NSSAI whether one of the people in a specific group is located in the corresponding region. As a specific example, if only ten people (or UEs) among the 100,000 network subscribers are allocated (or configured) the S-NSSAI value of 100, it may be identified that the UE which has transmitted a tapped registration request message (i.e., the registration request message containing the S-NSSAI value) is of one of the ten subscribers.

Given this, an S-NSSAI encryption method using the NAS security context may be considered during the registration request procedure, but in the initial context where the UE itself is not identified, the method may be hard to implement or may come in high complexity. Further, it may serve as an unnecessary burden unless the S-NSSAI itself threatens privacy in 5G system (i.e., NR system).

Further, if the S-NSSAI threatens privacy in addressing the privacy issues due to exposure of NSSAI or S-NSSAI, refraining from transmission of the S-NSSAI may also be considered. However, if the UE does not transmit the S-NSSAI or transmits a changed value which differs from the normal value, the UE may be suspected as operating abnormally.

Given all of these, according to the disclosure, there is proposed a method that enables flexible handling according to the network context without complicated encryption in relation to privacy issues that may arise due to exposure of NSSAI by using NSSAI on NAS signaling or AS signaling in the circumstance where there is no NAS security context or AS security context.

The method proposed in the disclosure may be used when the NSSAI or S-NSSAI in the NSSAI may be exposed by, e.g., tapping (e.g., wired/wireless tapping). The method proposed in the disclosure may apply likewise to privacy issues that may arise upon classifying users (or UEs) by group or service and efficiently routing to network function (e.g., AMF in the case of NSSAI) thereby.

A method for addressing the above-described privacy issues is described below. In the method proposed in the disclosure, in addition to the legacy allowed NSSAI and/or configured NSSAI, prioritized NSSAI which is a set of S-NSSAIs to be first used by the UE(s) is used for operation.

Such a method enables utilization of NSSAI for efficient routing and serving while protecting privacy (i.e., UE's privacy) per operator or local network. If (NSSAI) is used likewise upon registering all UEs in the network depending on the network context, the UEs may be difficult to differentiate and, thus, privacy may be efficiently protected.

The NSSAI (i.e., allowed NSSAI or configured NSSAI) mentioned herein and/or S-NSSAI(s) may be allocated per PLMN or per PLMN set. That is, the NSSAIs and/or configured NSSAIs allocated per PLMN may differ from each other.

Further, the prioritized NSSAI proposed herein may be downloaded or provided whenever needed, from the carrier network, i.e., home PLMN, where the UE subscribes. At this time, the prioritized NSSAI may be stored in the universal subscriber identity module (USIM) or other part of UE (e.g., mobile equipment (ME)) than the USIM. In this case, the same or similar way for storage and/or removal to that for configured NSSAI described above may be used.

Depending on whether there is prioritized NSSAI stored in (or provided to) the UE and/or what value is set as the prioritized NSSAI when the UE uses network slice selection assistance information (e.g., S-NSSAI or NSSAI) for registration (i.e., registration in PLMN), the UE may be configured to operate in the following methods 1) to 3).

Method 1)

First, if the UE lacks prioritized NSSAI available for PLMN, the UE may select S-NSSAI(s) for requested NSSAI for the allowed NSSAI and/or configured NSSAI in a legacy registration procedure. Here, the requested NSSAI may mean NSSAI that the UE provides or transfers to the network (e.g., PLMN or RAN) for registration procedure. That is, if there is no prioritized NSSAI provided for the UE, the UE may select the S-NSSAI to be used for registration procedure from among the existing allowed NSSAI and/or configured NSSAI.

As an example, this operation may be performed preferably in the case where no or little threat is posed to privacy although the invader taps the plane message transmitted without protection (i.e., without security context) by the UE for which the S-NSSAI values in the network (of a specific carrier) do not significantly depart from predefined values (e.g., values defined in 3GPP standard eMBB (enhanced Mobile BroadBand), mMTC (massive Machine Type Communication), URLLC (Ultra-Reliable and Low Latency Communication).

Method 2)

Or, if the prioritized NSSAI is present or set as NULL-NSSAI (i.e., allowed NSSAI with all the values set to 0) for PLMN, the UE may be configured not to include requested NSSAI in the registration request (message) for PLMN. In other words, if the prioritized NSSAI with all the values set to 0 are configured for the UE, the UE may not use (or transfer) the NSSAI in the registration request procedure for the PLMN.

As an example, this method may be considered, e.g., when there is no pseudonymous NSSAI and/or no protection mechanism for pseudonymous NSSAI although the network has NSSAI sensitive to privacy. That is, method 2 corresponds to the case where S-NSSAI is allocated and used in such a manner that privacy may be threatened upon exposure in the (specific carrier's) network and, in this case, the UE may be configured not to use the NSSAI and/or S-NSSAI unless signaling is encrypted by, e.g., security context.

Further, in this case, the UE may be registered in the default AMF or rearranged (or reallocated) in an appropriate AMF depending on its subscription. To meet demand for application/service, registration update and/or other AMF reallocation may be required.

Method 3)

Or, if prioritized NSSAI is present or set with PLMN default S-NSSAI(s) (not based on a specific UE) for PLMN, the UE may be configured to use the prioritized NSSAI as requested NSSAI in the registration request. This may be a version of further generalized NSSAI without risk in privacy or may be processed coarsely by a larger UE group. Otherwise, it may simply be set to the same value for the network.

Further, the prioritized NSSAI may be used as a container of pseudonymous NSSAI in a later phase, depending on the pseudonymous NSSAI scheme as needed or in the future.

As an example, as compared with when the UE does not transfer the NSSAI as plane message without protection (i.e., without security context) to each network, method 3) described above may be considered in the case where although a specific value is transferred, the value is less problematic than in the case of method 2).

At this time, as the prioritized NSSAI, the same value may be allocated to all of the UEs per network or different values may be allocated to the UEs randomly for load balancing of the first AMF selected in the network. In the latter case, the prioritized NSSAI, although used for AMF routing, may be helpless in selecting an AMF proper for the service desired by the UE. This may be enabled depending on how the association between AMF and RAN is configured. Specifically, if RAN functions are associated only with a specific AMF, the method may become less effective but, if multiple RAN functions are cross-associated with AMFs, the method may effectively be utilized.

Or, the prioritized NSSAI may be an S-NSSAI converted to have a higher level than that at which privacy may be threatened. In this case, the scheme may be of assistance in AMF selection and routing procedure.

As an example, in the case of signaling protected with a security text, S-NSSAIs that may correspond to the user group in 100 slices or services may be used, and S-NSSAIs as converted to have a higher level may be differentiated in the order of ten or five to help selecting a proper AMF. Specifically, if actual S-NSSAIs are configured for a dedicated communication service for police, and converted S-NSSAIs are allocated to a higher service, such as a critical service, the likelihood of routing to the AMF capable of supporting the same may advantageously increase.

Or, if a pseudonymous scheme is adopted for S-NSSAI, a pseudonymous S-NSSAI value may be included in the prioritized NSSAI. In other words, the above-described method 3) may be optimized per carrier or in such a manner as to help privacy protection, AMF selection and/or AMF routing.

The methods proposed in the disclosure may also be considered in relation to a scheme in which the home network (i.e., home PLMN) processes other PLMN(s) than PLMN(s) separately assigned prioritized NSSAI in the case where there is no prioritized NSSAI for a specific PLMN where the UE desires to register. That is, the home network (i.e., home PLMN) may additionally provide prioritized NSSAI for other PLMN(s) to the UE and, according to the corresponding value, the UE may be configured to operate based on the above-described methods 1) to 3).

If the UE transmits the value depending on the prioritized NSSAI value for the above-described other PLMN(s) upon roaming to other network, this may be intended for the policy of home PLMN. In this case, the information for the UE may pose additional privacy threat except that upon roaming to other network, the UE is identified as UE with other home network (i.e., home PLMN). This identification is caused merely due to adding information for routing to the home network in the legacy wireless communication system (e.g., LTE system) or next-generation system (e.g., 5G system, namely, NR system) but may be not due to NSSAI or network slice-related information.

Figure 4:
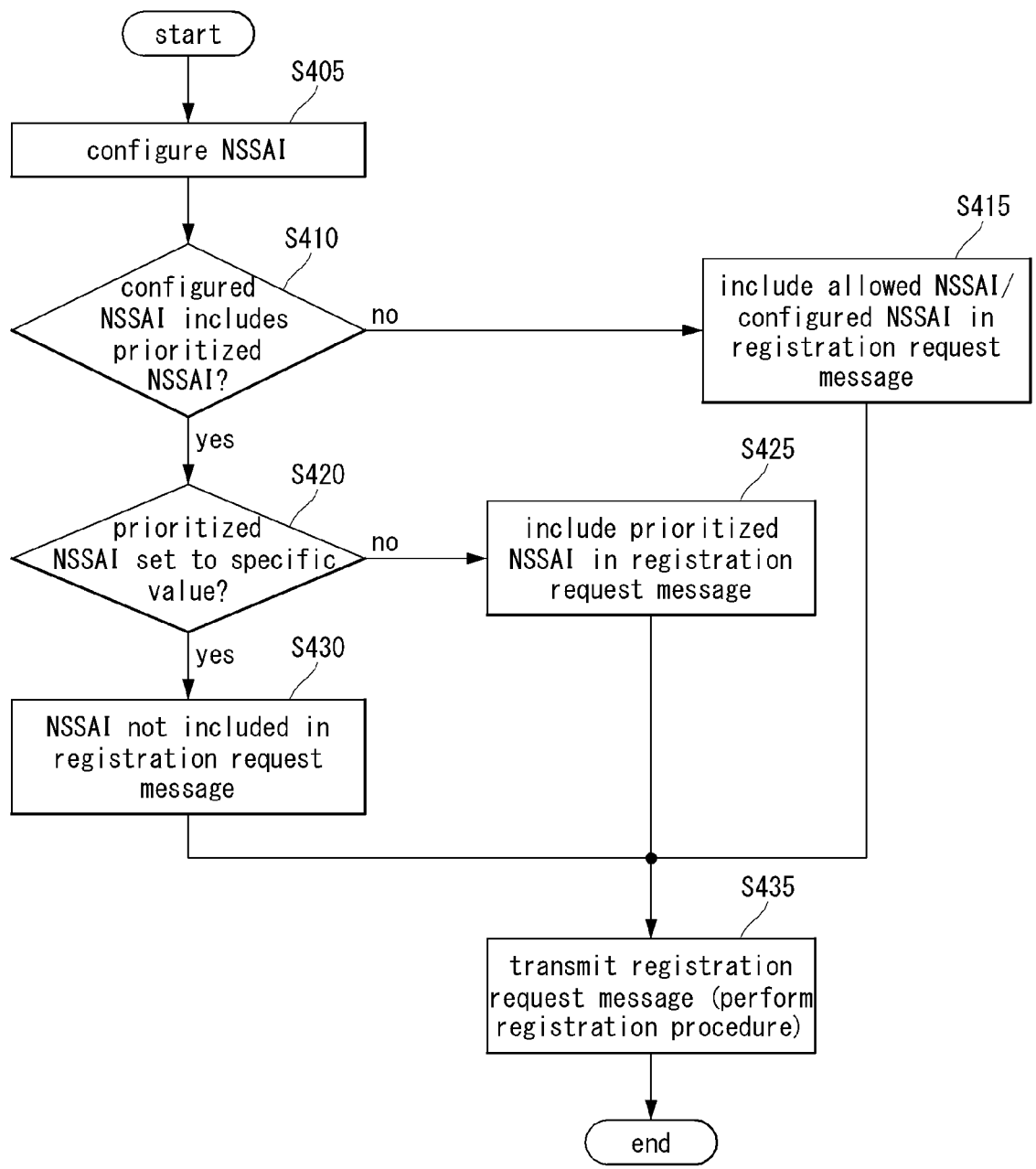
FIG. 4 is an example flowchart illustrating operations of a UE according to prioritized NSSAI in a wireless communication system to which a method as proposed in the disclosure may apply.

FIG. 4 is an example flowchart illustrating operations of a UE according to prioritized NSSAI in a wireless communication system to which a method as proposed in the disclosure may apply. FIG. 4 is intended merely for illustration purposes but not for limiting the scope of the disclosure.

Referring to FIG. 4, it is assumed to perform a procedure for registering a UE in a network (e.g., PLMN or RAN). In this case, it is assumed that the UE uses or applies the above-described methods as proposed in the disclosure.

First, the UE may have NSSAI-related information configured (or provided) from the network (step S405). This may, or may not, relay on the operator's policy. Thereafter, the UE may prepare for a registration procedure on the network.

Thereafter, the UE may determine whether the configured NSSAI includes prioritized NSSAI (step S410). If the prioritized NSSAI is not included, the UE may include allowed NSSAI and/or configured NSSAI in a registration request message (step S415).

In contrast, if prioritized NSSAI is included, the UE may determine whether the prioritized NSSAI has been set to a specific value (step S420). For example, the specific value may be a NULL value (i.e., all elements are set to 0) and/or another value indicating that NSSAI is not transmitted without protection (i.e., a value pre-defined by a predetermined value to indicate that NSSAI is not transmitted without protection). That is, the NULL value may be an example value indicating that the UE does not transmit NSSAI without protection.

Unless the prioritized NSSAI value is the specific value described above, the UE may include the prioritized NSSAI in the registration request message (step S425). In contrast, if the prioritized NSSAI value is the specific value described above, the UE may not include the NSSAI in the registration request message (step S430). In other words, if the prioritized NSSAI value indicates that NSSAI is not transmitted without protection, the UE may include no NSSAI in the registration request message.

Generating the registration request message according to the above-described operations, the UE may transmit the registration request message to the network (step S435). Then, the UE may go on with a procedure for registration in the network.

Figure 5:
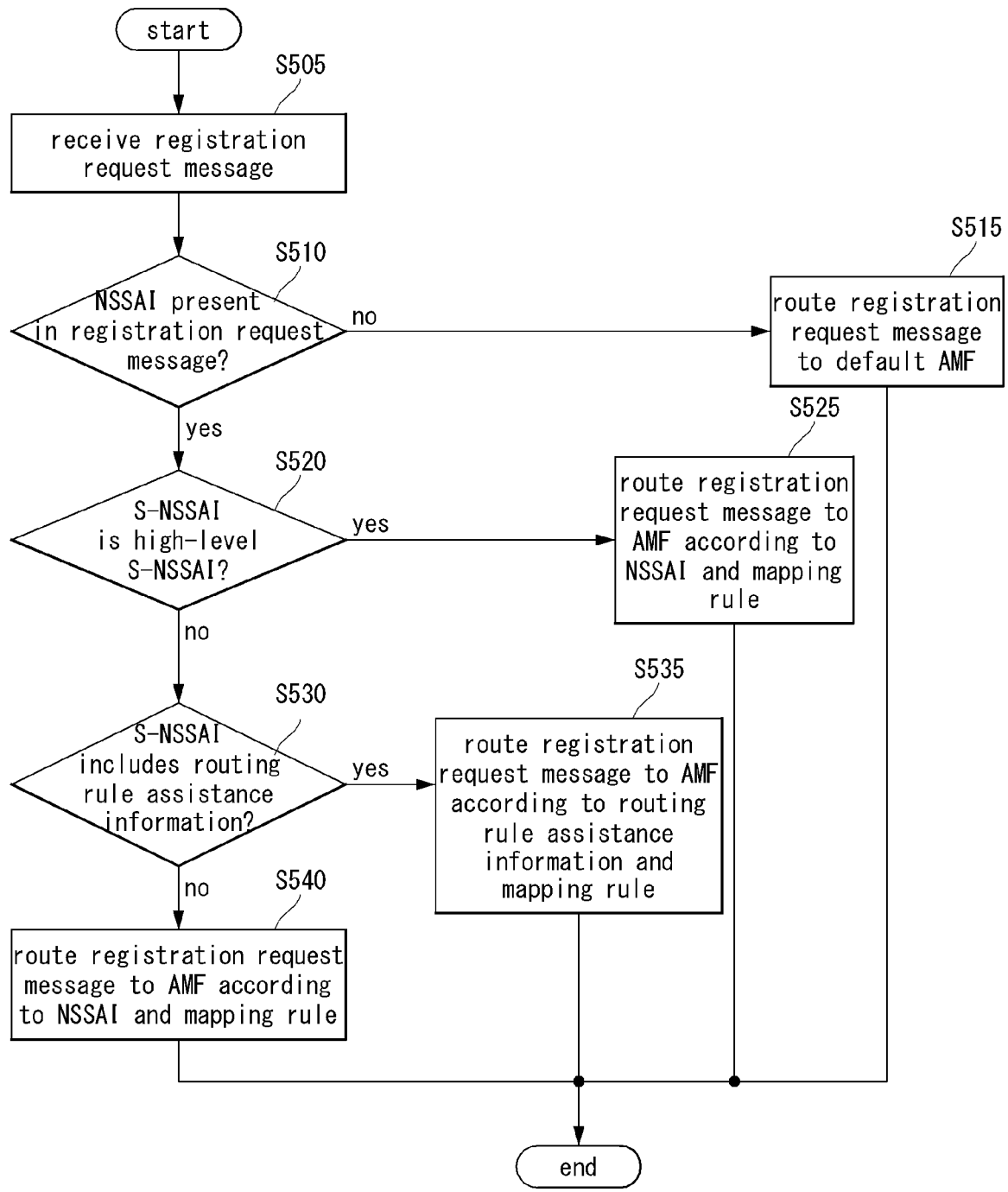
FIG. 5 is a flowchart illustrating operations of a network related to routing processing in a wireless communication system to which a method as proposed in the disclosure may apply.

FIG. 5 is a flowchart illustrating operations of a network related to routing processing in a wireless communication system to which a method as proposed in the disclosure may apply. FIG. 5 is intended merely for illustration purposes but not for limiting the scope of the disclosure.

Referring to FIG. 5, it is assumed that NSSAI for PLMN is configured for UE and the UE performs a registration procedure on the PLMN via RAN (e.g., base station).

First, the RAN may receive a registration request message from the UE (step S505). At this time, the base station may identify whether the received registration request message has NSSAI (step S510). As an example, the NSSAI may be the above-described prioritized NSSAI. That is, upon receiving the registration request message, the RAN may identify whether the registration request message includes requested NSSAI.

If the registration request message is determined to include NSSAI, the RAN may route the registration request message to the default AMF (step S515). At this time, the RAN may perform routing according to its policy. Further, as set forth above, the default AMF may mean an AMF pre-configured (or pre-defined) to, when a registration request message without requested NSSAI is transferred from the UE, have the registration request message routed.

In contrast, upon determining that NSSAI is included in the registration request message, the RAN may identify whether the S-NSSAI(s) constituting the NSSAI are high-level S-NSSAI(s) (step S520). Here, high-level S-NSSAI may mean an S-NSSAI configured (or allocated) for a high-level (e.g., high-importance) service among the services provided from the network.

If the S-NSSAI(s) constituting the NSSAI are high-level S-NSSAI(s), the RAN may route a registration request message to the AMF determined according to the received NSSAI and mapping rule in RAN (step S525). As an example, the mapping rule may mean a (pre-)configured connection between RAN and AMF.

In contrast, unless the S-NSSAI(s) constituting the NSSAI are high-level S-NSSAI(s), the RAN may identify whether the S-NSSAI includes assistance information related to the routing rule (step S530). Here, the routing rule-related assistance information (and/or whether the information is included) may be that not considering the service provided in the network.

If the routing rule-related assistance information is included in the S-NSSAI, the RAN may route the registration request message to the AMF determined as per the received routing rule-related assistance information and the mapping rule in RAN (step S535). Unless the routing rule-related assistance information is included in the S-NSSAI, the RAN may route the registration request message to the AMF determined as per the received NSSAI and mapping rule in RAN (step S540).

Figure 6:
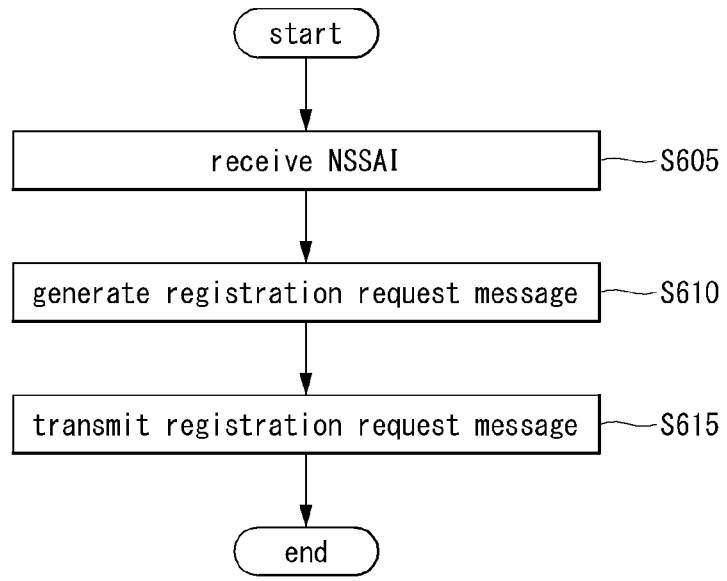
FIG. 6 is an example flowchart illustrating operations of a UE transmitting a registration request message in a wireless communication system to which a method as proposed in the disclosure may apply.

FIG. 6 is an example flowchart illustrating operations of a UE transmitting a registration request message in a wireless communication system to which a method as proposed in the disclosure may apply. FIG. 6 is intended merely for illustration purposes but not for limiting the scope of the disclosure.

Referring to FIG. 6, it is assumed that the UE performs a registration procedure on the network (e.g., PLMN) and, to that end, uses a specific node (e.g., RAN) of the network. In this case, transmission of a message to the specific node of the network may mean transmission of the message to the network. Further, the operations of FIG. 6 may refer to the above-described operations of FIG. 4. Thus, no duplicate description is given in connection with FIG. 6.

First, the UE may receive NSSAI for the network (S605). This may correspond to step S405 of FIG. 4 in which NSSAI is configured. At this time, the NSSAI may include at least one of first NSSAI (e.g., the above-described configured NSSAI) configured for the network, second NSSAI (e.g., the above-described allowed NSSAI) allowed for the network, and/or third NSSAI (e.g., the above-described prioritized NSSAI) configured for the UE.

Thereafter, the UE may generate a registration request message based on the received NSSAI (step S610). As set forth above, registration request message may mean a request message that the UE transmits for a registration procedure to the network.

At this time, the registration request message may be generated based on whether the third NSSAI is included in the NSSAI received in step S605 and/or based on the third NSSAI. As an example, the registration request message may be generated as in step S415, S425, or S430 of FIG. 4 described above.

Specifically, if the third NSSAI is included in the NSSAI received in step S605, the registration request message may be generated based on the value of the third NSSAI and, unless the third NSSAI is included in the NSSAI received in step S605, the registration request message may include at least one of the first NSSAI and/or the second NSSAI.

Further, if the third NSSAI is included in the NSSAI received in step S605, and the value of the third NSSAI is a preset, specific value, the registration request message may not include the first NSSAI, second NSSAI, and third NSSAI. That is, the registration request message may include no requested NSSAI. In contrast, if the third NSSAI is included in the NSSAI received in step S605, and the value of the third NSSAI is not the preset, specific value, the registration request message may include the third NSSAI.

Here, the preset specific value may be a NULL value (i.e., all the values are 0) and/or an S-NSSAI set to a value predefined as per a predetermined rule.

Further, as set forth above, the third NSSAI may include at least one S-NSSAIs. At this time, at least one S-NSSAI may be configured in a high-level first S-NSSAI group or a low-level second S-NSSAI group depending on the priority of the service provided from the network. If at least one S-NSSAI is configured in the first S-NSSAI group (i.e., if corresponding to a high-level S-NSSAI), an access and mobility management function (AMF) for the UE may be selected based on the at least one S-NSSAI (e.g., selecting the AMF to which the registration request message is routed as described above in connection with FIG. 5). In this case, the third NSSAI may be configured UE-specifically.

Thereafter, the UE may transmit the generated registration request message to the network. That is, the UE may transmit the generated registration request message to a specific node (e.g., RAN) of the network.

Figure 8:
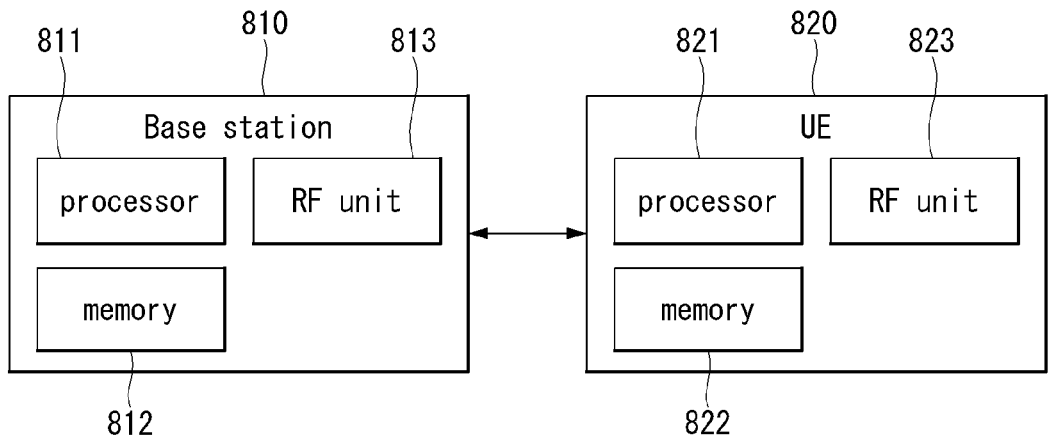
FIG. 8 is a block diagram illustrating a configuration of a communication device according to an embodiment of the disclosure.
Figure 9:
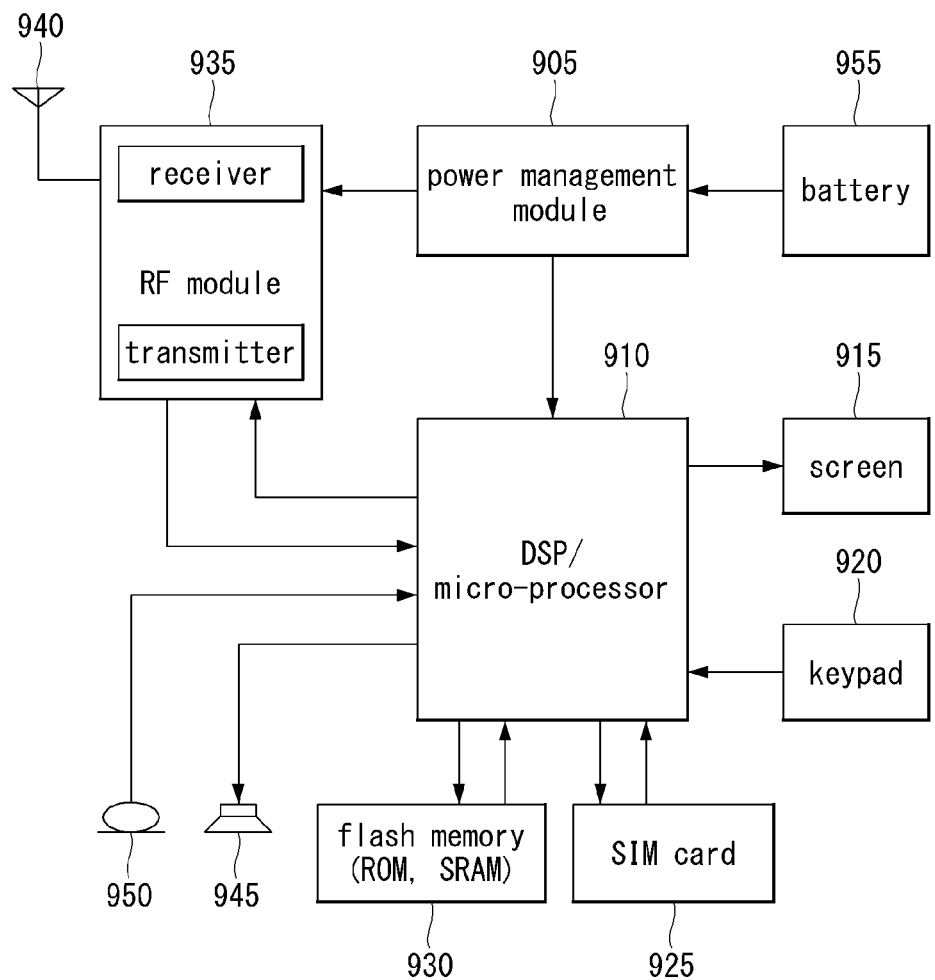
FIG. 9 is a block diagram illustrating a configuration of a communication device according to an embodiment of the disclosure.

In relation thereto, the UE may be configured as a device shown in FIGS. 8 and 9. Given this, the above-described operations of FIG. 6 (and/or FIG. 4) may be performed by the devices shown in FIGS. 8 and 9.

In other words, the processor 821 (or processor 910) may control to receive NSSAI for the network (step S605). Further, the processor 821 (or processor 910) may control to generate a registration request message based on the received NSSAI (step S610). Further, the processor 821 (or processor 910) may control to transmit the generated registration request message to the network (step S615).

Figure 7:
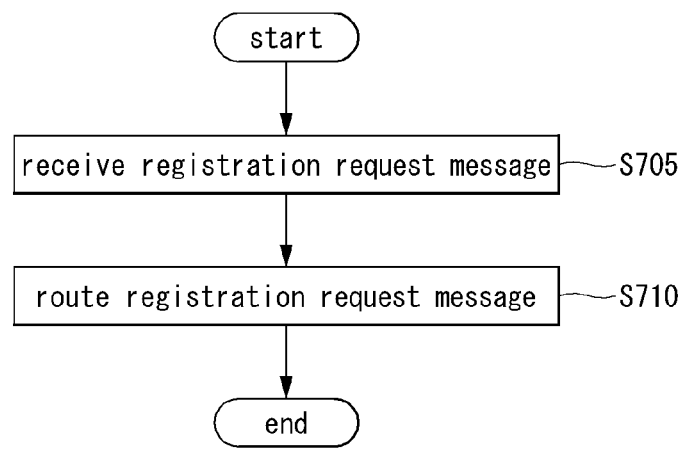
FIG. 7 is an example flowchart illustrating operations of a network routing a registration request message in a wireless communication system to which a method as proposed in the disclosure may apply.

FIG. 7 is an example flowchart illustrating operations of a network routing a registration request message in a wireless communication system to which a method as proposed in the disclosure may apply. FIG. 7 is intended merely for illustration purposes but not for limiting the scope of the disclosure.

Referring to FIG. 7, it is assumed, as described above in connection with FIG. 6, that the UE performs a registration procedure on the network (e.g., PLMN) and, to that end, uses a specific node (e.g., RAN) of the network. In this case, the operation of the network may mean the operation of a specific node of the network. Further, the operations of FIG. 7 may refer to the above-described operations of FIG. 5. Thus, no duplicate description is given in connection with FIG. 7.

First, the network (e.g., RAN) may receive a registration request message from the UE (step S705). This may correspond to step S505 of FIG. 5 in which the registration request message is received.

Thereafter, the network may route the received registration request message to a specific AMF (step S710). Here, the specific AMF may be selected by referring to step S515, S525, S535, or S540 of FIG. 5 described above.

At this time, as described above in connection with FIG. 6, the UE may receive network slice selection assistance information (NSSAI) for the network. Here, the NSSAI may include at least one of first NSSAI (e.g., configured NSSAI) configured for the network, second NSSAI (e.g., allowed NSSAI) allowed for the network, and/or third NSSAI (e.g., prioritized NSSAI) configured for the UE. Further, the registration request message transmitted by the UE may be generated based on whether the third NSSAI is included in the NSSAI and/or based on the value of the third NSSAI.

Since the above-described generation of registration request message and/or third NSSAI is the same as or similar to those of FIG. 6, no duplicate description is given below.

In connection therewith, the network may be configured with devices as shown in FIG. 8. Given this, the operations of network described above in connection with FIG. 7 may be performed by a device (i.e., a device of the base station) as shown in FIG. 8.

In other words, the processor 811 may control to receive a registration request message from the UE (step S705). Further, the processor 811 may control to route the received registration request message to a specific AMF (step S710).

By the operations of the UE and/or network as described above, it may be possible to reduce a threat to UE privacy that may occur due to transfer of NSSAI despite lack of security context in signaling (e.g., SNA signaling) between UE and network.

Devices to which the present disclosure may apply

FIG. 8 is a block diagram illustrating a configuration of a communication device according to an embodiment of the disclosure.

Referring to FIG. 8, a wireless communication system includes a network node 810 and multiple UEs 820.

The network node 810 includes a processor 811, a memory 812, and a communication module 813. The processor 811 implements the functions, processes or steps, and/or methods proposed above in connection with FIGS. 1 to 7. Wired/wireless interface protocol layers may be implemented by the processor 811. The memory 812 is connected with the processor 811 to store various pieces of information for driving the processor 811. The communication module 813 is connected with the processor 811 to transmit and/or receive wireless signals. The network node 810 may correspond to, e.g., a base station, MME, HSS, SGW, PGW, SCEF, or SCS/AS. In particular, where the network node 810 is a base station, the communication module 813 may include a radio frequency (RF) unit for transmitting/receiving wireless signals.

The UE 820 includes a processor 821, a memory 822, and a communication module (or RF unit) 823. The processor 821 implements the functions, processes or steps, and/or methods proposed above in connection with FIGS. 1 to 7. Wireless interface protocol layers may be implemented by the processor 821. The memory 822 is connected with the processor 821 to store various pieces of information for driving the processor 821. The communication module 823 is connected with the processor 821 to transmit and/or receive wireless signals.

The memory 812 and 822 may be positioned inside or outside the processor 811 and 821 and be connected with the processor 811 and 821 via various known means. The network node 810 (e.g., a base station) and/or the UE 820 may have a single antenna or multiple antennas.

FIG. 9 is a block diagram illustrating a configuration of a communication device according to an embodiment of the disclosure.

In particular, FIG. 9 illustrates in greater detail the UE of FIG. 8.

Referring to FIG. 9, the UE may include a processor (or a digital signal processor (DSP)) 910, an RF module (or RF unit) 935, a power management module 905, an antenna 940, a battery 955, a display 915, a keypad 920, a memory 930, a subscriber identification module (SIM) card 925 (which is optional), a speaker 945, and a microphone 950. The UE may include a single or multiple antennas.

The processor 910 implements the functions, processes or steps, and/or methods proposed above in connection with FIGS. 1 to 7. Wireless interface protocol layers may be implemented by the processor 910.

The memory 930 is connected with the processor 910 to store information related to the operation of the processor 910. The memory 930 may be positioned inside or outside the processor 910 and be connected with the processor 910 via various known means.

For example, the user inputs instruction information, e.g., a phone number, by voice activation using the microphone 950 or by pressing (or touching) a button of the keypad 920. The processor 910 receives the instruction information and handles performing a proper function, e.g., calling at the phone number. Operational data may be extracted from the SIM card 925 or the memory 930. Further, the processor 910 may display the instruction information or operational information on the display 915 for convenience or user's recognition.

The RF module 935 is connected with the processor 910 to transmit and/or receive RF signals. The processor 910 transfers instruction information to the RF module 935 to initiate communication, e.g., to transmit a wireless signal constituting voice communication data. The RF module 935 includes a receiver and a transmitter for receiving and transmitting wireless signals. The antenna 940 functions to transmit and receive wireless signals. Upon receiving a wireless signal, the RF module 935 transfers the signal for processing by the processor 910 and convert the signal into a base-band signal. The processed signal may be converted into readable or audible information output via the speaker 945.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the present disclosure should be determined by reasonable interpretations of the appended claims and all equivalents of the present disclosure belong to the scope of the present disclosure. Industrial Availability Although the disclosure has been shown and described in connection with examples applied to 3GPP LTE/LTE-A/NR systems, the present disclosure may also be applicable to other various wireless communication systems than 3GPP LTE/LTE-A/NR systems.

The invention claimed is:

1. A method of transmitting a registration request message for a network by a user equipment (UE) in a wireless communication system, the method comprising:
   receiving network slice selection assistance information (NSSAI) for the network, the NSSAI including at least one of first NSSAI configured for the network, second NSSAI allowed for the network, and/or third NSSAI configured for the UE;
   generating the registration request message based on the NSSAI; and
   transmitting the registration request message to the network,
   wherein the registration request message is generated based on whether the third NSSAI is included in the NSSAI and/or based on a value of the third NSSAI,
   wherein based on the third NSSAI being included in the NSSAI, the registration request message is generated based on the value of the third NSSAI,
   wherein unless the third NSSAI is included in the NSSAI, the registration request message includes at least one of the first NSSAI and/or the second NSSAI,
   wherein based on the third NSSAI being included in the NSSAI, and the value of the third NSSAI being a preset specific value, the registration request message does not include the first NSSAI, the second NSSAI, and the third NSSAI, and
   wherein based on the third NSSAI being included in the NSSAI, and the value of the third NSSAI not being the preset specific value, the registration request message is included in the third NSSAI.

2. The method of claim 1, wherein the preset specific value is a single (S)-NSSAI set to a NULL value or a value preset according to a predetermined rule.

3. The method of claim 1, wherein the third NSSAI includes at least one S-NSSAI, and
   Wherein the at least one S-NSSAI is configured in a high-level first S-NSSAI group or a low-level second S-NSSAI group depending on priority of a service provided by the network.

4. The method of claim 3, wherein based on the at least one S-NSSAI being configured in the first S-NSSAI group, an access and mobility management function (AMF) for the UE is selected based on the at least one S-NSSAI.

5. The method of claim 4, wherein the third NSSAI is configured UE-specifically.

6. A user equipment (UE) configured to transmit a registration request message to a network in a wireless communication system, the UE comprising:
   a transceiver for transmitting/receiving a signal; and
   a processor configured to control the transceiver, wherein the processor is further configured to control the UE to:
   receive network slice selection assistance information (NSSAI) for the network, the NSSAI including at least one of first NSSAI configured for the network, second NSSAI allowed for the network, and/or third NSSAI configured for the UE;
   generate the registration request message based on the NSSAI; and
   transmit the registration request message to the network,
   wherein the registration request message is generated based on whether the third NSSAI is included in the NSSAI and/or based on a value of the third NSSAI,
   wherein based on the third NSSAI being included in the NSSAI, the registration request message is generated based on the value of the third NSSAI,
   wherein unless the third NSSAI is included in the NSSAI, the registration request message includes at least one of the first NSSAI and/or the second NSSAI,
   wherein based on the third NSSAI being included in the NSSAI, and the value of the third NSSAI being a preset specific value, the registration request message does not include the first NSSAI, the second NSSAI, and the third NSSAI, and
   wherein based on the third NSSAI being included in the NSSAI, and the value of the third NSSAI not being the preset specific value, the registration request message is included in the third NSSAI.

7. The UE of claim 6, wherein the preset specific value is a single (S)-NSSAI set to a NULL value or a value preset according to a predetermined rule.

8. The UE of claim 6, wherein the third NSSAI includes at least one S-NSSAI, and
   wherein the at least one S-NSSAI is configured in a high-level first S-NSSAI group or a low-level second S-NSSAI group depending on priority of a service provided by the network.

9. The UE of claim 8, wherein based on the at least one S-NSSAI being configured in the first S-NSSAI group, an access and mobility management function (AMF) for the UE is selected based on the at least one S-NSSAI.

10. The UE of claim 9, wherein the third NSSAI is configured UE-specifically.

11. A network configured to route a registration request message for the network in a wireless communication system, the network comprising:
    a transceiver for transmitting/receiving a signal; and
    a processor configured to control the transceiver, wherein the processor is further configured to:
    receive the registration request message from a UE; and
    route the registration request message to a specific access and mobility management function (AMF),
    wherein the UE receives network slice selection assistance information (NSSAI) for the network, the NSSAI including at least one of first NSSAI configured for the network, second NSSAI allowed for the network, and/or third NSSAI configured for the UE, and wherein
    wherein the registration request message is generated based on whether the third NSSAI is included in the NSSAI and/or based on a value of the third NSSAI,
    wherein based on the third NSSAI being included in the NSSAI, the registration request message is generated based on the value of the third NSSAI,
    wherein unless the third NSSAI is included in the NSSAI, the registration request message includes at least one of the first NSSAI and/or the second NSSAI,
    wherein based on the third NSSAI being included in the NSSAI, and the value of the third NSSAI being a preset specific value, the registration request message does not include the first NSSAI, the second NSSAI, and the third NSSAI, and wherein based on the third NSSAI being included in the NSSAI, and the value of the third NSSAI not being the preset specific value, the registration request message is included in the third NSSAI.

\* \* \* \* \*